(12) United States Patent
Adharapurapu et al.

(10) Patent No.: US 10,105,795 B2
(45) Date of Patent: Oct. 23, 2018

(54) BRAZE COMPOSITIONS, AND RELATED DEVICES

(75) Inventors: Raghavendra Rao Adharapurapu, Schenectady, NY (US); Sundeep Kumar, Bangalore (IN); Mohamed Rahmane, Ballston Lake, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 32 days.

(21) Appl. No.: 13/538,203

(22) Filed: Jun. 29, 2012

(65) Prior Publication Data

US 2013/0316222 A1 Nov. 28, 2013

Related U.S. Application Data

(60) Provisional application No. 61/651,817, filed on May 25, 2012.

(51) Int. Cl.
*H01M 4/64* (2006.01)
*H01M 4/66* (2006.01)
(Continued)

(52) U.S. Cl.
CPC .......... *B23K 35/304* (2013.01); *B23K 35/001* (2013.01); *B23K 35/004* (2013.01); *B23K 35/0233* (2013.01); *B23K 35/0238* (2013.01); *B23K 35/3033* (2013.01); *B23K 35/327* (2013.01); *C04B 37/006* (2013.01); *C04B 37/026* (2013.01); *C22C 9/06* (2013.01); *C22C 19/05* (2013.01); *H01M 2/08* (2013.01);
(Continued)

(58) Field of Classification Search
CPC .......... H01M 4/64; H01M 4/66; H01M 4/661; H01M 4/662; H01M 4/664; H01M 2/08; H01M 10/04
See application file for complete search history.

(56) References Cited

U.S. PATENT DOCUMENTS 2,240,064 A 4/1941 Allen et al.
2,856,281 A 10/1958 Cremer et al.
(Continued)

FOREIGN PATENT DOCUMENTS

CN 1666334 A 9/2005
CN 1919515 A 2/2007
(Continued)

OTHER PUBLICATIONS

European Search Report and Written Opinion issued in connection with corresponding EP Application No. 13169250.1-1362 dated Oct. 16, 2013.
(Continued)

*Primary Examiner* — Karie O'Neill Apicella
(74) *Attorney, Agent, or Firm* — GE Global Patent Operation; John Darling

(57) ABSTRACT

A braze alloy composition for sealing a ceramic component to a metal component in an electrochemical cell is presented. The braze alloy composition includes copper, nickel, and an active metal element. The braze alloy includes nickel in an amount less than about 30 weight percent, and the active metal element in an amount less than about 10 weight percent. An electrochemical cell using the braze alloy for sealing a ceramic component to a metal component in the cell is also provided.

12 Claims, 2 Drawing Sheets

(51) Int. Cl.

| | | |
|---|---|---|
| H01M 2/08 | (2006.01) | |
| H01M 10/04 | (2006.01) | |
| B23K 35/30 | (2006.01) | |
| B23K 35/32 | (2006.01) | |
| H01M 10/39 | (2006.01) | |
| B23K 35/00 | (2006.01) | |
| B23K 35/02 | (2006.01) | |
| C04B 37/00 | (2006.01) | |
| C04B 37/02 | (2006.01) | |
| C22C 9/06 | (2006.01) | |
| C22C 19/05 | (2006.01) | |
| H01M 10/02 | (2006.01) | |
| H01M 10/38 | (2006.01) | |
| B23K 103/18 | (2006.01) | |
| H01M 2/02 | (2006.01) | |
| B23K 103/00 | (2006.01) | |
| B23K 101/18 | (2006.01) | |
| B23K 101/36 | (2006.01) | |
| B23K 101/38 | (2006.01) | |
| B23K 103/16 | (2006.01) | |

(52) U.S. Cl.
CPC ........... *H01M 10/02* (2013.01); *H01M 10/39* (2013.01); *H01M 10/3963* (2013.01); *B23K 35/025* (2013.01); *B23K 35/0244* (2013.01); *B23K 2201/18* (2013.01); *B23K 2201/36* (2013.01); *B23K 2201/38* (2013.01); *B23K 2203/16* (2013.01); *B23K 2203/18* (2013.01); *B23K 2203/26* (2015.10); *B23K 2203/52* (2015.10); *C04B 2237/123* (2013.01); *C04B 2237/124* (2013.01); *C04B 2237/127* (2013.01); *C04B 2237/343* (2013.01); *C04B 2237/405* (2013.01); *C04B 2237/70* (2013.01); *H01M 2/0252* (2013.01); *H01M 10/38* (2013.01); *Y10T 403/479* (2015.01)

(56) References Cited

U.S. PATENT DOCUMENTS

| | | | |
|---|---|---|---|
| 2,992,918 | A | 7/1961 | Edwin et al. |
| 4,486,386 | A | 12/1984 | Mizuhara |
| 4,490,437 | A | 12/1984 | Mizuhara |
| 4,497,772 | A | 2/1985 | Mizuhara |
| 4,603,090 | A | 7/1986 | Mizuhara |
| 4,621,761 | A | 11/1986 | Hammond et al. |
| 4,639,388 | A | 1/1987 | Ainsworth et al. |
| 4,740,429 | A | 4/1988 | Tsuno |
| 4,900,638 | A | 2/1990 | Emmerich |
| 5,013,612 | A | 5/1991 | Hunt et al. |
| 5,340,012 | A | 8/1994 | Beeferman et al. |
| 5,392,982 | A | 2/1995 | Li |
| 5,600,530 | A | 2/1997 | Smith |
| 5,922,479 | A * | 7/1999 | Taniguchi ........ B23K 35/3006 123/90.48 |
| 6,131,797 | A | 10/2000 | Gasdaska et al. |
| 6,149,051 | A | 11/2000 | Vollmer et al. |
| 6,264,761 | B1 | 7/2001 | Hasegawa et al. |
| 6,523,605 | B2 | 2/2003 | Doko et al. |
| 6,528,123 | B1 | 3/2003 | Cadden et al. |
| 6,605,164 | B2 | 8/2003 | Kennedy et al. |
| 6,605,371 | B1 | 8/2003 | Ueda et al. |
| 7,436,058 | B2 | 10/2008 | Hua et al. |
| 7,445,294 | B2 | 11/2008 | Hall et al. |
| 7,651,023 | B2 | 1/2010 | Huang et al. |
| 7,815,848 | B2 | 10/2010 | Crum et al. |
| 8,110,301 | B2 | 2/2012 | Iacovangelo et al. |
| 2003/0019761 | A1 | 1/2003 | Jaworowski et al. |
| 2004/0262367 | A1* | 12/2004 | Nakamura ........ 228/122.1 |
| 2007/0154338 | A1 | 7/2007 | Sathian et al. |
| 2007/0231664 | A1 | 10/2007 | Zerfass et al. |
| 2008/0220313 | A1 | 9/2008 | Zerfass et al. |
| 2008/0268323 | A1 | 10/2008 | Tucker et al. |
| 2009/0011331 | A1 | 1/2009 | Stringer et al. |
| 2009/0087340 | A1* | 4/2009 | Hartmann et al. ........ 420/472 |
| 2009/0305078 | A1 | 12/2009 | Sjodin |
| 2010/0055495 | A1 | 3/2010 | Sjoedin |
| 2010/0075160 | A1 | 3/2010 | Chaumat et al. |
| 2010/0255398 | A1* | 10/2010 | Jacobson et al. ........ 429/452 |
| 2010/0327537 | A1 | 12/2010 | Johnson et al. |
| 2012/0063911 | A1 | 3/2012 | Bossmann et al. |
| 2012/0164510 | A1* | 6/2012 | Weaver et al. ........ 429/142 |

FOREIGN PATENT DOCUMENTS

| | | | | |
|---|---|---|---|---|
| CN | 101003109 A | | 7/2007 | |
| CN | 101172880 A | | 5/2008 | |
| CN | 1010327551 A | * | 12/2008 | ........ B22F 3/16 |
| CN | 101745753 A | | 6/2010 | |
| EP | 0104623 A2 | | 4/1984 | |
| EP | 0428275 A1 | | 5/1991 | |
| EP | 0726238 A2 | | 8/1996 | |
| GB | 1415988 A | | 12/1975 | |
| JP | 40019730 B | | 9/1965 | |
| JP | 5016640 A | | 2/1975 | |
| JP | 6216896 A | | 1/1987 | |
| JP | 62104696 A | | 5/1987 | |
| JP | 62212095 A | | 9/1987 | |
| JP | 62275596 A | | 11/1987 | |
| JP | 63317284 A | | 12/1988 | |
| JP | 0347901 A | | 2/1991 | |
| JP | 04310581 A | | 11/1992 | |
| JP | 05285689 A | | 11/1993 | |
| JP | 0691389 A | | 4/1994 | |
| JP | 08119761 A | | 5/1996 | |
| JP | 1029075 A | | 2/1998 | |
| JP | 10193210 A | | 7/1998 | |
| JP | 2001321961 A | | 11/2001 | |
| JP | 2009260023 A | | 11/2009 | |
| JP | 2009283313 A | | 12/2009 | |
| JP | 2012500465 A | | 1/2012 | |
| WO | 199965642 A1 | | 12/1999 | |
| WO | WO 9965642 A1 | * | 12/1999 | ........ B23K 35/3033 |
| WO | 0018537 A1 | | 4/2000 | |
| WO | 2013130192 A1 | | 9/2013 | |

OTHER PUBLICATIONS

Mondal et al., "Development and Characterization of Ag—Cu—Ti Alloys for Ceramic Brazing", National Metallurgical Laboratory, pp. 121-128.

Mizuhara et al., "Ceramic-to-Metal Joining with Active Brazing Filler Metal", 16th International AWS Brazing Conference, pp. 27-32, 1985.

European Search Report and Opinion issued in connection with corresponding EP Application No. 13169240.2 dated Oct. 16, 2013.

U.S. Final Office Action issued in connection with corresponding U.S. Appl. No. 13/600,333 dated Jan. 30, 2015.

U.S. Non-Final Office Action issued in connection with corresponding U.S. Appl. No. 13/600,333 dated Jun. 19, 2015.

Unofficial English Translation of Chinese Office Action issued in connection with corresponding CN Application No. 2013101961374 dated Nov. 24, 2015.

Unofficial English Translation of Chinese Office Action issued in connection with corresponding CN Application No. 2013101960174 dated Nov. 30, 2015.

Nascimento et al., "Recent Advances in Metal-Ceramic Brazing", Cerâmica, vol. No. 49, pp. 178-198, 2003.

Jasim et al., "Actively Brazed Alumina to Alumina Joints using CuTi, CuZr and Eutectic AgCuTi Filler Alloys", Ceramics International, vol. No. 36, pp. 2287-2295, 2010.

Unofficial English Translation of Japanese Search Report issued in connection with corresponding JP Application No. 2013107545 dated Jan. 5, 2017.

Unofficial English Translation of Japanese Office issued in connection with corresponding JP Application No. 2013107545 dated Jan. 24, 2017.

(56) References Cited

OTHER PUBLICATIONS

Unofficial English Translation of Japanese Office issued in connection with corresponding JP Application No. 2013107544 dated Feb. 7, 2017.
Unofficial English Translation of Japanese Search Report issued in connection with corresponding JP Application No. 2013107544 dated Feb. 28, 2017.
Yu et al, Chapter 3 Welding of ceramic matrix composite, Composite Materials Welding, 2012, 137-143, China Machine press, CPCH 1361386, 29 Pages.
U.S. Non-Final Office Action issued in connection with related U.S. Appl. No. 13/600,333 dated Nov. 14, 2016, 19 Pages.
Unofficial English translation of Office Action issued in connection with corresponding CN Application No. 201310196137.4 dated Nov. 14, 2016, 14 Pages.

\* cited by examiner

BRAZE COMPOSITIONS, AND RELATED DEVICES

CROSS REFERENCE TO RELATED APPLICATIONS

This application relates to, and claims priority from, provisionally filed U.S. patent application having Ser. No. 61/651,817, entitled "COMPOSITIONS FOR BRAZING, AND RELATED METHODS AND DEVICES", filed on May 25, 2012, which application is hereby incorporated by reference.

TECHNICAL FIELD

This invention generally relates to a braze composition. In some specific embodiments, the invention relates to a braze composition that provides corrosion-resistant sealing and other benefits to high temperature rechargeable batteries.

BACKGROUND OF THE INVENTION

Many types of seal materials have been considered for use in high-temperature rechargeable batteries/cells for joining different components. Sodium/sulfur or sodium/metal halide cells generally include several ceramic and metal components. The ceramic components include an electrically insulating alpha-alumina collar and an ion-conductive electrolyte beta-alumina tube, and are generally joined or bonded via a sealing glass. The metal components include a metallic casing, current collector components, and other metallic components which are often joined by welding or thermal compression bonding (TCB). However, metal-to-ceramic bonding can sometimes present some difficulty, mainly due to thermal stress caused by a mismatch in the coefficient of thermal expansion for the ceramic and metal components.

The metal-to ceramic bonding is most critical for the reliability and safety of the cell. Many types of seal materials and sealing processes have been considered for joining metal to ceramic components, including ceramic adhesives, brazing, and sintering. However, most of the seals may not be able to withstand high temperatures and corrosive environments.

A common bonding technique involves multiple steps of metalizing the ceramic component, followed by bonding the metallized ceramic component to the metal component using TCB. The bond strength of such metal-to-ceramic joints is controlled by a wide range of variables, for example, the microstructure of the ceramic component, the metallization of the ceramic component, and various TCB process parameters. In order to ensure good bond strength, the process requires close control of several parameters involved in various process steps. In short, the method is relatively expensive, and complicated, in view of the multiple processing steps, and the difficulty in controlling the processing steps.

Brazing is another potential technique for making the ceramic-to-metal joints. A braze material is heated above its melting point, and distributed between two or more close-fitting parts by capillary action. However, most of the brazing materials (or braze materials) have limitations that prevent them from fulfilling all of the necessary requirements of high temperature batteries. Moreover, some of the commercial braze materials can be quite expensive themselves; and using them efficiently in various processes can also be costly.

It may be desirable to develop new braze alloy compositions that have properties and characteristics that meet performance requirements for high temperature rechargeable batteries, and are less complicated and less expensive to process, as compared to the existing sealing methods.

BRIEF DESCRIPTION

Various embodiments of the present invention may provide braze alloy compositions for sealing a ceramic to a metal, to form a seal that can withstand corrosive environments.

In accordance with an embodiment of the invention, a braze alloy composition is disclosed, comprising copper, nickel, and an active metal element. The braze alloy includes nickel in an amount less than about 30 weight percent, and the active metal element in an amount less than about 10 weight percent.

In one embodiment, an electrochemical cell incorporating the braze alloy composition is disclosed. The braze alloy includes an active metal element that forms a ceramic-to-metal joint, and has good sodium- and halide-resistance at operating temperatures, along with other complimentary mechanical properties; stability at high temperatures; and good thermal expansion properties, and the like. In one embodiment, an energy storage device is also disclosed.

BRIEF DESCRIPTION OF DRAWINGS

These and other features, aspects, and advantages of the present invention will become better understood when the following detailed description is read with reference to the accompanying drawings, wherein.

DETAILED DESCRIPTION

Figure 1:
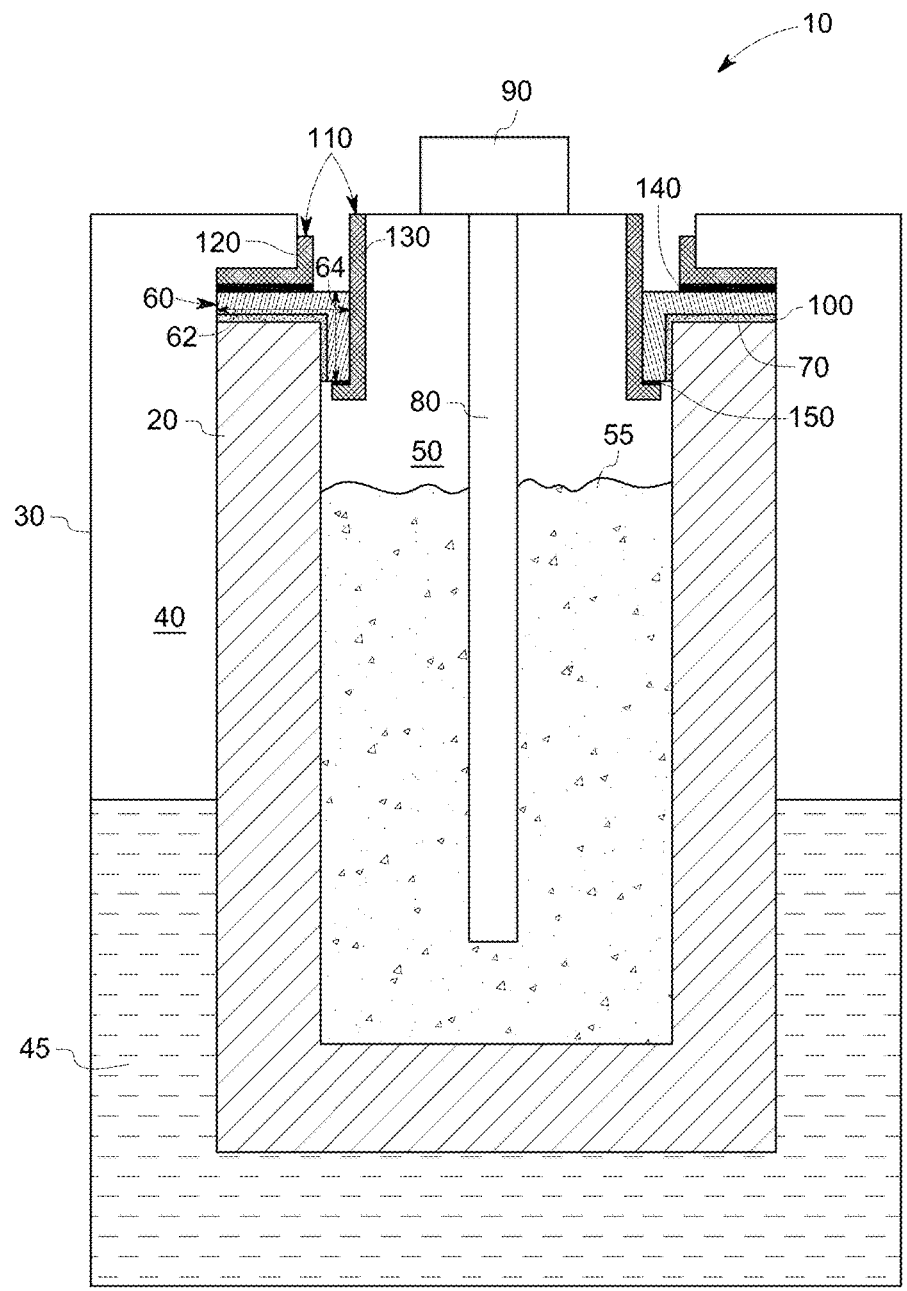
FIG. 1 is a schematic view showing a cross-section of an electrochemical cell, according to an embodiment.

The invention includes embodiments that relate to a braze alloy composition for sealing an electrochemical cell, for example a sodium/sulfur or a sodium metal halide battery. The invention also includes embodiments that relate to an electrochemical cell made by using the braze composition. As discussed in detail below, some of the embodiments of the present invention provide a braze alloy for sealing a ceramic component to a metal component, and a method for the same, e.g., for a metal halide battery. These embodiments advantageously provide an improved seal and method for the sealing. Though the present discussion provides examples in the context of a metal halide battery, these processes can be applied to any other application, including ceramic-to-metal or ceramic-to-ceramic joining.

When introducing elements of various embodiments of the present invention, the articles "a," "an," "the," and "said" are intended to mean that there are one or more of the elements, unless otherwise indicated. The terms "comprising," "including," and "having" are intended to be inclusive, and mean that there may be additional elements other than the listed elements. As used herein, the term "and/or" includes any and all combinations of one or more of the associated listed items. Unless otherwise indicated herein, the terms "disposed on", "deposited on" or "disposed between" refer to both direct contact between layers, objects, and the like, or indirect contact, e.g., having intervening layers therebetween.

Approximating language, as used herein throughout the specification and claims, may be applied to modify any quantitative representation that could permissibly vary without resulting in a change in the basic function to which it may be related. Accordingly, a value modified by a term such as "about" is not limited to the precise value specified. In some instances, the approximating language may correspond to the precision of an instrument for measuring the value.

As used herein, the term "liquidus temperature" generally refers to a temperature at which an alloy is transformed from a solid into a molten or viscous state. The liquidus temperature specifies the maximum temperature at which crystals can co-exist with the melt in thermodynamic equilibrium. Above the liquidus temperature, the alloy is homogeneous, and below the liquidus temperature, an increasing number of crystals begin to form in the melt with time, depending on the particular alloy. Generally, an alloy, at its liquidus temperature, melts and forms a seal between two components to be joined.

The liquidus temperature can be contrasted with a "solidus temperature". The solidus temperature quantifies the point at which a material completely solidifies (crystallizes). The liquidus and solidus temperatures do not necessarily align or overlap. If a gap exists between the liquidus and solidus temperatures, then within that gap, the material consists of solid and liquid phases simultaneously (like a "slurry").

"Sealing" is a function performed by a structure that joins other structures together, to reduce or prevent leakage through the joint between the other structures. The seal structure may also be referred to as a "seal" herein, for the sake of simplicity.

Typically, "brazing" uses a braze material (usually an alloy) having a lower liquidus temperature than the melting points of the components (i.e. their materials) to be joined. The braze material is brought slightly above its melting (or liquidus) temperature while protected by a suitable atmosphere. The braze material then flows over the components (known as wetting), and is then cooled to join the components together. As used herein, "braze alloy composition" or "braze alloy", "braze material" or "brazing alloy", refers to a composition that has the ability to wet the components to be joined, and to seal them. A braze alloy, for a particular application, should withstand the service conditions required, and melts at a lower temperature than the base materials; or melts at a very specific temperature. Conventional braze alloys usually do not wet ceramic surfaces sufficiently to form a strong bond at the interface of a joint. In addition, the alloys may be prone to sodium and halide corrosion.

As used herein, the term "brazing temperature" refers to a temperature to which a brazing structure is heated to enable a braze alloy to wet the components to be joined, and to form a braze joint or seal. The brazing temperature is often higher than or equal to the liquidus temperature of the braze alloy. In addition, the brazing temperature should be lower than the temperature at which the components to be joined may become chemically, compositionally, and mechanically unstable. There may be several other factors that influence the brazing temperature selection, as those skilled in the art understand.

Embodiments of the present invention provide a braze alloy composition capable of forming a joint by "active brazing" (described below). In some specific embodiments, the composition also has high resistance to sodium and halide corrosion. The braze alloy composition includes copper, nickel, and an active metal element, as described herein. Each of the elements of the alloy usually contributes to at least one property of the overall braze composition. These properties may include liquidus temperature, coefficient of thermal expansion, flowability or wettability of the braze alloy with a ceramic; corrosion resistance, and ease-of-processing. Some of the properties are described below.

According to most of the embodiments of the invention, the braze alloy composition is a copper-based alloy, that is, the braze alloy contains a relatively high amount of copper compared to the amount of other elements in the alloy. Usually, the level of copper present is at least about 50 weight percent, based on the total weight of the braze alloy composition. In some specific embodiments, e.g., some of those related to structures for sodium metal halide batteries, the level of copper is at least about 70 weight percent. In other preferred embodiments, the level of copper is at least about 90 weight percent. In addition to being relatively inexpensive, copper is a highly ductile metal, and thus copper-based alloys can be processed using a wide variety of cost-effective techniques, such as rolling, melt-spinning, and powder atomization. Generally, copper containing alloys have good corrosion resistance in a sodium-containing environment, but may be susceptible to corrosion in a halide-containing environment.

In order to address some of the problems associated with corrosion, the present inventors discovered that nickel could be used along with the copper. Nickel provides a degree of chemical inertness in a corrosive environment. Additionally, nickel can also increase the liquidus temperature of the alloy composition. However, a high amount of nickel may undesirably raise the liquidus temperature of the alloy composition, i.e., above the required brazing temperature.

Thus, the present inventors conceived of a balance of nickel and copper levels that optimized the liquidus temperature requirements and the requirements for corrosion resistance. It was also discovered that the presence of nickel in these specific types of braze alloys may enhance other properties, such as the thermal expansion coefficient, and the phase stability. In some embodiments of this invention, a suitable level for the amount of nickel is less than about 30 weight percent, based on the total weight of the braze alloy. In some embodiments, nickel is present from about 1 weight percent to about 25 weight percent, based on the total weight of the braze alloy. In some specific embodiments, nickel is present from about 3 weight percent to about 20 weight percent, based on the total weight of the braze alloy.

As mentioned above, the concept of "active brazing" is important for embodiments of this invention. Active brazing is a technique often used to join a ceramic to a metal, or a ceramic to a ceramic. Active brazing uses an active metal element that promotes wetting of a ceramic surface, enhancing the capability of providing a hermetic seal. An "active metal element", as used herein, refers to a reactive metal that has high affinity to the oxygen within the ceramic, and thereby reacts with the ceramic. A braze alloy containing an active metal element can also be referred to as an "active braze alloy." The active metal element undergoes a decomposition reaction with the ceramic, when the braze alloy is in molten state, and leads to the formation of a thin reaction layer on the interface of the ceramic and the braze alloy. The thin reaction layer allows the braze alloy to wet the ceramic surface, resulting in the formation of a ceramic-ceramic or a ceramic-metal joint/bond, which may also be referred to as "active braze seal."

Thus, an active metal element is an essential constituent of a braze alloy for employing active brazing. A variety of suitable active metal elements may be used to form the active braze alloy. The selection of a suitable active metal element mainly depends on the chemical reaction with the ceramic (e.g., alumina) to form a uniform and continuous reaction layer, and the capability of the active metal element of forming an alloy with a base alloy (e.g. Cu—Ni alloy). In some preferred embodiments for the present invention, the active metal element is titanium. Other suitable examples of the active metal element include, but are not limited to, zirconium, hafnium, and vanadium. A combination of two or more active metal elements may also be used.

The presence and the amount of the active metal may influence the thickness and the quality of the thin reactive layer, which contributes to the wettability or flowability of the braze alloy, and therefore, the bond strength of the resulting joint. In some embodiments, the active metal is present in an amount less than about 10 weight percent, based on the total weight of the braze alloy. A suitable range is often from about 0.5 weight percent to about 5 weight percent. In some specific embodiments, the active metal is present in an amount ranging from about 1 weight percent to about 3 weight percent, based on the total weight of the braze alloy. The active metal element is generally present in small amounts suitable for improving the wetting of the ceramic surface, and forming the thin reaction layer, for example, less than about 10 microns. A high amount of the active metal layer may cause or accelerate halide corrosion.

The braze alloy composition may further include at least one alloying element. The alloying element may provide further adjustments in several required properties of the braze alloy, for example, the coefficient of thermal expansion, liquidus temperature, brazing temperature, corrosion resistance, and the strength of the braze alloy. In one embodiment, the alloying element can include, but is not limited to, cobalt, iron, chromium, niobium, molybdenum, tungsten, palladium, or a combination thereof. In some embodiments, the braze alloy includes up to about 30 weight percent (e.g., about 1%-30%) of the alloying element, based on the total weight of the braze alloy. In some embodiments, the braze alloy includes up to about 10 weight percent chromium, and in some specific embodiments, up to about 5 weight percent chromium, based on the total weight of the braze alloy. In other specific embodiments, the braze alloy includes up to about 2 weight percent niobium, based on the total weight of the braze alloy. In some embodiments, the braze alloy includes up to about 1 weight percent of molybdenum, based on the total weight of the braze alloy.

In some embodiments, any of the braze alloys described herein may also include palladium. The addition of palladium may improve the corrosion resistance of the overall composition. The braze alloy may include up to about 40 weight percent palladium, based on the total weight of the braze alloy. In some specific embodiments, the braze alloy includes up to about 10 weight percent of palladium, based on the total weight of the braze alloy.

As discussed above, the braze alloy has a liquidus temperature lower than the melting temperatures of the components to be joined. In one embodiment, the braze alloy has a liquidus temperature of at least about 850 degrees Celsius. In one embodiment, the braze alloy has a liquidus temperature from about 850 degrees Celsius to about 1300 degrees Celsius, and in some specific embodiments, from about 950 degrees Celsius to about 1250 degrees Celsius.

Some embodiments provide an electrochemical cell that comprises a first component and a second component joined to each other by a braze alloy composition. The cell may be a sodium-sulfur cell or a sodium-metal halide cell, for example. As described previously, the braze alloy composition includes copper, nickel, and an active metal element. At least one additional alloying element, such as chromium, palladium, niobium, molybdenum, and/or tungsten may further be added. The constituents of the alloy and their respective amounts are described above.

As discussed above, the braze alloy composition may provide an active braze seal to join components in the cell. In one embodiment, the first component of the cell comprises a metal, and the second component comprises a ceramic. The metal component can be a ring that includes nickel. The ceramic component can be a collar that includes an electrically insulating material, such as alpha-alumina.

For example, sodium-sulfur or sodium-metal halide cells may contain the braze alloy composition that forms an active braze seal to form metal-to-ceramic joints. The active braze seal secures an alpha-alumina collar and a nickel ring. FIG. 1 is a schematic diagram depicting an exemplary embodiment of a sodium-metal halide battery cell 10. The cell 10 has an ion-conductive separator tube 20 disposed in a cell case 30. The separator tube 20 is usually made of β-alumina or β"-alumina. The tube 20 defines an anodic chamber 40 between the cell case 30 and the tube 20, and a cathodic chamber 50, inside the tube 30. The anodic chamber 40 is usually filled with an anodic material 45, e.g. sodium. The cathodic chamber 50 contains a cathode material 55 (e.g. nickel and sodium chloride), and a molten electrolyte, usually sodium chloroaluminate ($NaAlCl_4$).

An electrically insulating ceramic collar 60, which may be made of alpha-alumina, is situated at a top end 70 of the tube 20. A cathode current collector assembly 80 is disposed in the cathode chamber 50, with a cap structure 90, in the top region of the cell. The ceramic collar 60 is fitted onto the top end 70 of the separator tube 20, and is sealed by a glass seal 100. In one embodiment, the collar 60 includes an upper portion 62, and a lower inner portion 64 that abuts against an inner wall of the tube 20, as illustrated in FIG. 1.

In order to seal the cell 10 at the top end (i.e., its upper region), and protect the alumina collar 60 in the corrosive environment, a metal ring 110 is sometimes disposed, covering the alpha alumina collar 60, and joining the collar with the current collector assembly 80, underneath the cap structure 90. The metal ring 110 has two portions; an outer metal ring 120 and an inner metal ring 130, which are joined, respectively, with the upper portion 62 and the lower portion 64 of the ceramic collar 60, by means of the active braze seals 140 and 150. The active braze seal 140, the seal 150, or both, may be formed by using one of the suitable braze alloy compositions described above. The collar 60 and the metal ring 110 may be temporarily held together with an assembly (e.g., a clamp), or by other techniques, until sealing is complete.

The outer metal ring 120 and the inner metal ring 130 are usually welded shut to seal the cell, after joining with the ceramic collar 60 is completed. The outer metal ring 120 can be welded to the cell case 30; and the inner metal ring 130 can be welded to the current collector assembly 80.

The shape and size of the several components discussed above with reference to FIG. 1 are only illustrative for the understanding of the cell structure; and are not meant to limit the scope of the invention. The exact position of the seals and the joined components can vary to some degree. Moreover, each of the terms "collar" and "ring" is meant to comprise metal or ceramic parts of circular or polygonal shape, and in general, all shapes that are compatible with a particular cell design.

The braze alloys and the active braze seal formed thereof, generally have good stability and chemical resistance within determined parameters at a determined temperature. It is desirable (and in some cases, critical) that the braze seal retains its integrity and properties during several processing steps while manufacturing and using the cell, for example, during a glass-seal process for a ceramic-to-ceramic joint, and during operation of the cell. In some instances, optimum performance of the cell is generally obtained at a temperature greater than about 300 degrees Celsius. In one embodiment, the operating temperature may be in a range from about 270 degrees Celsius to about 450 degrees Celsius. In one embodiment, the glass-seal process is carried out at a temperature of at least about 1000 degrees Celsius. In some other embodiments, the glass-seal process is carried out in a range of from about 1000 degrees Celsius to about 1200 degrees Celsius. Moreover, the bond strength and hermeticity of the seal may depend on several parameters, such as the composition of the braze alloy, thickness of the thin reaction layer, the composition of the ceramic, and the surface properties of the ceramic.

In accordance with some embodiments of this invention, an energy storage device includes a plurality of the electrochemical cells as disclosed in previous embodiments. The cells are, directly or indirectly, in thermal and/or electrical communication with each other. Those of ordinary skill in the art are familiar with the general principles of such devices.

Some embodiments provide a method for joining a first component to a second component by using a braze alloy composition. The method includes the step(s) of introducing the braze alloy between the first component and the second component to form a brazing structure. (The alloy could be deposited on one or both of the mating surfaces, for example, as also described below). The brazing structure can then be heated to form an active braze seal between the first component and the second component. In one embodiment, the first component includes a ceramic; and the second component includes a metal. The braze alloy composition includes copper, nickel, and an active metal element. At least one additional alloying element, such as chromium, palladium, niobium, molybdenum, cobalt, iron, and/or tungsten, may further be added. The constituents of the braze alloy and their respective amounts (and proportions) are described above.

In the general preparation of the braze alloy, a desired alloy powder mixture may be obtained by combining (e.g., mixing and/or milling) commercial metal powders of the constituents in their respective amounts. In some embodiments, the braze alloy may be employed as a foil, a sheet, a ribbon, a preform, or a wire, or may be formulated into a paste containing water and/or organic fluids. In some embodiments, the precursor metals or metal alloys may be melted to form homogeneous melts, before being formed and shaped into particles. In some cases, the molten material can be directly shaped into foils, preforms or wires. Forming the materials into particles, initially, may comprise spraying the alloy melt into a vacuum, or into an inert gas, to obtain a pre-alloyed powder of the braze alloy. In other cases, pellets of the materials may be milled into a desired particle shape and size.

In one embodiment, a layer of the braze alloy is disposed on at least one surface of the first component or the second component to be joined by brazing. The layer of the braze alloy, in a specific embodiment, is disposed on a surface of the ceramic component. The thickness of the alloy layer may be in a range between about 5 microns and about 100 microns. In some specific embodiments, the thickness of the layer ranges from about 10 microns to about 50 microns. The layer may be deposited or applied on one or both of the surfaces to be joined, by any suitable technique, e.g. by a printing process or other dispensing processes. In some instances, the foil, wire, or the preform may be suitably positioned for bonding the surfaces to be joined.

In some specific embodiments, a sheet or foil of the braze alloy may be desirable. As discussed previously, the braze alloys described herein are ductile and easy to process. For example, the alloys can be easily rolled into sheets or foils. The thickness of sheets or foils may vary between about 20 microns and about 200 microns.

In a typical embodiment, the method further includes the step of heating the brazing structure at the brazing temperature. When the brazing structure is heated at the brazing temperature, the braze alloy melts and flows over the surfaces. The heating can be undertaken in a controlled atmosphere, such as ultra-high pure argon, hydrogen and argon, ultra-high pure helium; or in a vacuum. To achieve good flow and wetting of the braze alloy, the brazing structure is held at the brazing temperature for a few minutes after melting of the braze alloy, and this period may be referred to as "brazing time". During the brazing process, a load can also be applied on the samples.

The brazing temperature and the brazing time may influence the quality of the active braze seal. The brazing temperature is generally less than the melting temperatures of the components to be joined, and higher than the liquidus temperature of the braze alloy. In one embodiment, the brazing temperature ranges from about 900 degrees Celsius to about 1500 degrees Celsius, for a time period of about 1 minute to about 30 minutes. In a specific embodiment, the heating is carried out at a brazing temperature from about 1000 degrees Celsius to about 1300 degrees Celsius, for about 5 minutes to about 15 minutes.

During brazing, the active metal element (or elements) present in the melt decomposes, and forms a thin reactive layer at the interface of the ceramic surface and the braze alloy, as described previously. The thickness of the reactive layer may range from about 0.1 micron to about 2 microns, depending on the amount of the active metal element available to react with the ceramic, and depending on the surface properties of the ceramic component. In a typical sequence, the brazing structure is then subsequently cooled to room temperature; with a resulting, active braze seal between the two components. In some instances, rapid cooling of the brazing structure is permitted.

Some of the embodiments of the present invention advantageously provide braze alloys, which are chemically stable in the corrosive environment, relative to known braze alloys, and are capable of forming an active braze seal for a ceramic-to-metal joint. These braze alloys have high sodium corrosion resistance, and acceptable halide corrosion resistance for many end uses. The formation of ceramic-to-metal seals for high temperature cells (as discussed above) by active brazing simplifies the overall cell-assembly process, and improves the reliability and performance of the cell. The present invention provides advantages to leverage a relatively inexpensive, simple, and rapid process to seal the cell or battery, as compared to currently available methods.

EXAMPLES

The examples that follow are merely illustrative, and should not be construed to be any sort of limitation on the scope of the claimed invention. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Example 1

4 braze alloy compositions (samples 1-4) were prepared. For each braze sample, individual elements were weighed according to the desired composition, as shown in Table 1. These elements were arc-melted to provide an ingot for each composition. To ensure homogeneity of the compositions, the ingots of the samples were triple-melted. The liquidus temperature of the 3 samples (sample 1, 2, and 3) were measured using Differential Scanning calorimeter (DSC).

TABLE 1

| Braze Samples | Braze alloy composition (weight percent) | Liquidus temperature (° C.) |
|---|---|---|
| Sample 1 | Cu—3Ni—2Ti | 1109 |
| Sample 2 | Cu—10Ni—2Ti | 1130 |
| Sample 3 | Cu—20Ni—2Ti | 1183 |
| Sample 4 | Cu—10Pd—15Ni—2Cr—0.5Mo—2Ti | 1150 (calculated) |

The ingot of sample 1 was rolled into an approximately 50 micron-thick sheet. The sheet of sample 1 was then placed between the surfaces of two alpha alumina pieces (parts) to be joined. This assembly was then heated up to about 1200 degrees Celsius for about 10 minutes, and then cooled to room temperature, to form a joint.

Figure 2:
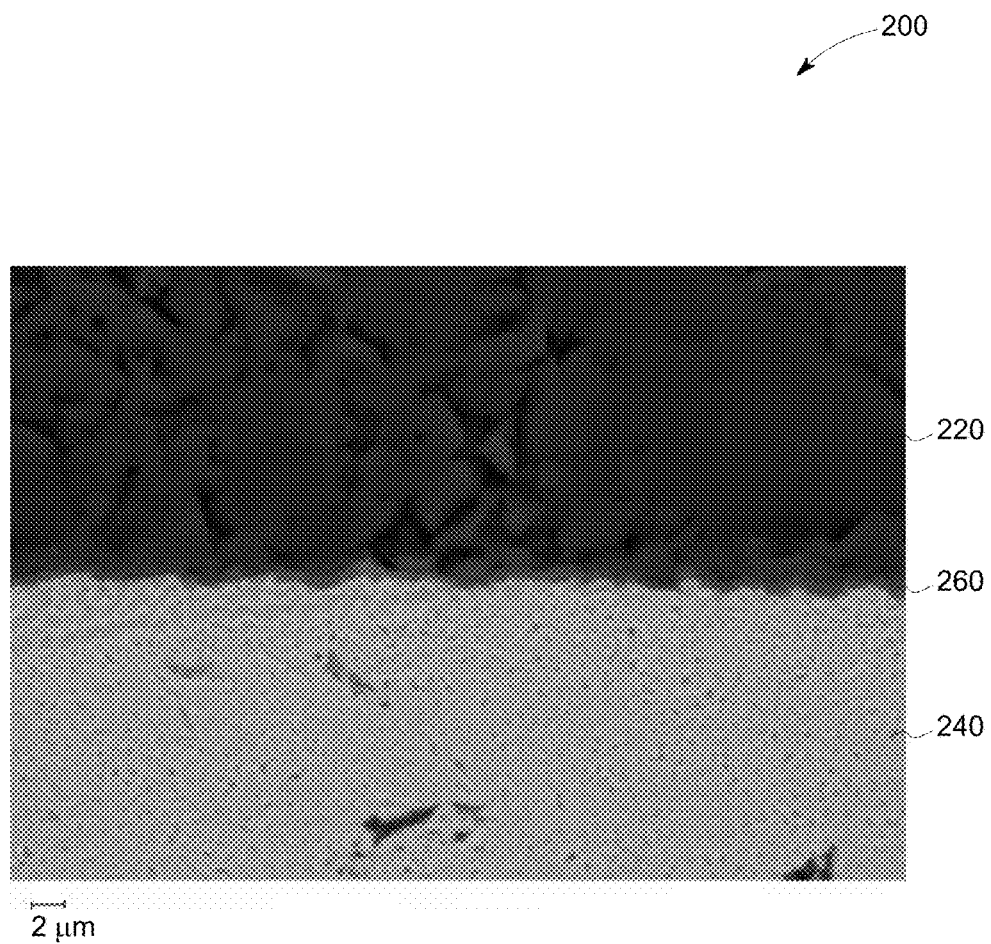
FIG. 2 is a scanning electron micrograph showing an interface between a ceramic and a braze alloy.

FIG. 2 shows a cross-section SEM image 200 of an interface between the alpha alumina 220 and braze sample 1, 240 at the joint. A reaction layer 260 was observed between the braze sample 1 and alumina at the braze-ceramic interface, which indicates a reaction between the braze alloy and the ceramic, and the formation of an active braze seal. Inspection with Energy Dispersive Analysis of X-Rays (EDAX) suggested that the composition of the reaction layer 260 included metallic and semi-metallic sub-oxides of titanium (e.g., $Ti_2O$, TiO), which would have been formed by the reaction of the titanium in braze sample 1, with alumina.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrochemical cell, comprising:
a tubular separator disposed in a cell case defining a portion of a cathodic chamber and an anodic chamber, wherein the cathodic chamber comprises an alkali metal halide, and forms an ion that is capable of conducting through the separator;
an electrically insulating ceramic collar disposed on a top end of the separator; and
a metal ring disposed on the electrically insulating ceramic collar,
wherein the electrically insulating ceramic collar is joined to the metal ring by a braze alloy composition comprising from about 70 weight percent to about 90 weight percent copper, from about 3 weight percent to about 20 weight percent nickel, and from about 0.5 weight percent to about 5 weight percent of the active metal element, based on the total weight of the braze alloy composition, and wherein the active metal element comprises titanium, zirconium, hafnium, vanadium, or combinations thereof, and wherein the braze alloy composition is in direct contact with both the electrically insulating ceramic collar and the metal ring.

2. The electrochemical cell of claim 1, wherein the alkali metal halide comprises sodium halide.

3. The electrochemical cell of claim 1, wherein the anodic chamber comprises sodium.

4. A sodium-metal halide battery, comprising a plurality of electrochemical cells as defined in claim 1.

5. The electrochemical cell of claim 1, wherein the braze alloy composition comprises from about 1 weight percent to about 3 weight percent of the active metal element, based on the total weight of the braze alloy composition.

6. The electrochemical cell of claim 1, wherein the active metal element comprises titanium.

7. The electrochemical cell of claim 1, wherein the braze alloy composition further comprises an additional alloying element selected from the group consisting of chromium, niobium, cobalt, iron, molybdenum, tungsten, palladium, and combinations thereof.

8. The electrochemical cell of claim 1, wherein the braze alloy composition has a liquidus temperature in a range from about 850 degrees Celsius to about 1250 degrees Celsius.

9. The electrochemical cell of claim 1, wherein the metal ring comprises nickel.

10. The electrochemical cell of claim 1, wherein the electrically insulating ceramic collar comprises alumina.

11. The electrochemical cell of claim 1, wherein the braze alloy composition comprises an active braze seal that joins the metal, ring to the electrically insulating ceramic collar.

12. The electrochemical cell of claim 10, wherein the active braze seal comprises a thin reaction layer at an interface of the electrically insulating ceramic collar and the braze alloy composition.

* * * * *